United States Patent
Knör et al.

(10) Patent No.: US 12,546,391 B2
(45) Date of Patent: Feb. 10, 2026

(54) METHOD AND CONTROL UNIT FOR OPERATING A DRIVE TRAIN OF A VEHICLE

(71) Applicant: ZF Friedrichshafen AG, Friedrichshafen (DE)

(72) Inventors: Jonas Knör, Erbach (DE); Roland Jäger, Grasbrunn (DE); Dennis Schaer, Meckenbeuren (DE); Philipp Kölbl, Friedrichshafen (DE); Michael Miller, Leutkirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 256 days.

(21) Appl. No.: 18/455,120

(22) Filed: Aug. 24, 2023

(65) Prior Publication Data

US 2024/0068563 A1 Feb. 29, 2024

(30) Foreign Application Priority Data

Aug. 25, 2022 (DE) ...................... 10 2022 208 791.7

(51) Int. Cl.
*F16H 61/12* (2010.01)
*F16H 61/00* (2006.01)

(52) U.S. Cl.
CPC ..... *F16H 61/12* (2013.01); *F16H 2061/0053* (2013.01); *F16H 2061/0068* (2013.01); *F16H 2061/0087* (2013.01); *F16H 2061/1288* (2013.01)

(58) Field of Classification Search
CPC ............. F16H 61/12; F16H 2061/0053; F16H 2061/0068; F16H 2061/0087; F16H 2061/1288; F16D 48/06; F16D 48/08
See application file for complete search history.

(56) References Cited

U.S. PATENT DOCUMENTS

| | | | | |
|---|---|---|---|---|
| 11,209,054 | B1 * | 12/2021 | Zhang | .................... F16D 48/066 |
| 2017/0307030 | A1 * | 10/2017 | Bühle | .................... B60W 20/40 |
| 2019/0219163 | A1 * | 7/2019 | Meyer | ...................... F16D 48/02 |

FOREIGN PATENT DOCUMENTS

| | | | |
|---|---|---|---|
| DE | 10248179 A1 | 4/2004 | |
| DE | 102014214876 A1 | 2/2016 | |
| DE | 102017220626 A1 | 5/2019 | |
| DE | 102018222095 A1 | 6/2020 | |
| DE | 102020100713 A1 * | 7/2021 | ............. F16D 48/06 |

OTHER PUBLICATIONS

German Search Report De 10 2022 208 791.7, dated Feb. 28, 2023. (10 pages).

* cited by examiner

*Primary Examiner* — Edwin A Young
(74) *Attorney, Agent, or Firm* — Dority & Manning, P.A.

(57) ABSTRACT

A method for operating a drive train (1) of a vehicle includes, in order to check the plausibility of an adapted charge pressure value, changing an actuating pressure of a starting component (7) corresponding to an adapted charge pressure value by an offset and ascertaining a resultant change in a torque of an electric machine (3). When the change in the torque of the electric machine (3) and the offset of the actuating pressure correspond to each other within defined limits, a plausible adapted charge pressure value is inferred. When the change in the torque of the electric machine (3) and the offset of the actuating pressure do not correspond to each other within the defined limits, an implausible adapted charge pressure value is inferred.

11 Claims, 2 Drawing Sheets

METHOD AND CONTROL UNIT FOR OPERATING A DRIVE TRAIN OF A VEHICLE

CROSS-REFERENCE TO RELATED APPLICATION

The present application is related and has right of priority to German Patent Application No. 102022208791.7 filed on Aug. 25, 2022, which is incorporated by reference in its entirety for all purposes.

FIELD OF THE INVENTION

The invention relates generally to a method for operating a drive train of a vehicle. The invention further relates generally to a control unit for operating a drive train of a vehicle.

BACKGROUND

A drive train of a vehicle includes, in addition to a drive unit, a transmission connected between the drive unit and a driven end. The transmission converts rotational speeds and torques and, in this way, provides the available tractive force of the drive unit at the driven end.

In a hybrid vehicle, the drive unit includes an internal combustion engine and an electric machine. In a fully electric vehicle, the drive unit includes at least one electric machine.

The transmission of a vehicle includes shift elements. In every force-locking gear of the transmission, a first number of shift elements is engaged and a second number of shift elements is disengaged. In order to implement a gear ratio change from an actual gear into a target gear, at least one shift element, which is engaged in the actual gear, is disengaged for the target gear, and at least one shift element, which is disengaged in the actual gear, is engaged for the target gear. One of the shift elements of the transmission of the motor vehicle, namely a friction-locking shift element of the transmission, can be used as a starting component. A transmission-external, friction-locking clutch can also be used as a starting component.

In order to be able to carry out a starting process as comfortably as possible, it is necessary to know the charge pressure value of the starting component. The charge pressure value is the pressure of the starting component, at which the starting component begins to transmit torque. If the starting component is actuated with the charge pressure value, the charge pressure value is therefore to be in the touch point of the starting component, in which the starting component begins to transmit torque.

For a transmission, the charge pressure value of the starting component is predefined on the control side. Due to component tolerances and due to wear, the control-side-predefined charge pressure value can deviate from the actual charge pressure value, however, as a result of which a starting process cannot be carried out with the necessary comfort. Therefore, it is known from the prior art to adapt a control-side-predefined charge pressure value in order to provide an adapted charge pressure value.

DE 102 48 179 A1 discloses a method for adapting the charge pressure of a shift element of a transmission. In order to adapt the charge pressure of the shift element, the engaged shift element is disengaged in a defined manner, when the vehicle is stationary, until a predefined differential speed threshold is exceeded.

DE 10 2014 214 876 A1 discloses one further method for adapting a charge pressure of a shift element of a transmission.

DE 10 2017 220 626 A1 discloses one further method for adapting the charge pressure.

Despite the charge pressure value having been adapted, the adapted charge pressure value may possibly be faulty. Previously, no measures have been known, by which the risk of a faulty adaptation of the charge pressure value of the starting component can be reduced.

SUMMARY OF THE INVENTION

Example aspects of the present invention provide a method for operating a drive train of a vehicle and a control unit for operating a drive train of a vehicle, which can reduce the risk of a faulty adaptation of the charge pressure of the starting component.

According to example aspects of the invention, in order to check the plausibility of the adapted charge pressure value, the actuating pressure of the starting component corresponding to the adapted charge pressure value is changed by an offset and a resultant change in the torque of the electric machine is ascertained. For the case in which the change in the torque of the electric machine and the offset of the actuating pressure correspond to each other within defined limits, a plausible adapted charge pressure value is inferred. However, for the case in which the change in the torque of the electric machine and the offset of the actuating pressure do not correspond to each other within the defined limits, an implausible adapted charge pressure value is inferred. The aim of example aspects of the invention is to check the plausibility of an adapted charge pressure value after this charge pressure value to be adapted has been adapted. For this purpose, an actuating pressure of the starting component corresponding to the adapted charge pressure value is changed by the defined offset. The resultant change in the torque at the electric machine is ascertained. Depending thereon, the plausibility of the adapted charge pressure value is checked. The risk of a faulty adaptation can be reduced by the plausibility check.

Preferably, for the case in which a plausible adapted charge pressure value is inferred, the adapted charge pressure value is actually used to adapt the predefined charge pressure value to be adapted. For the case in which an implausible adapted charge pressure value is inferred, the adapted charge pressure value is not used to adapt the predefined charge pressure value to be adapted. This also serves to reduce the risk of a faulty adaptation of the charge pressure value of the starting component.

Preferably, in order to check the plausibility of the adapted charge pressure value, the actuating pressure of the starting component corresponding to the adapted charge pressure value is increased by an offset and the resultant change in the torque of the electric machine is ascertained. For the case in which the torque at the electric machine increases by a defined amount within a defined plausibility-check time period, a plausible adapted charge pressure value is inferred. Otherwise, an implausible adapted charge pressure value is inferred.

Similarly, in order to check the plausibility of the adapted charge pressure value, the actuating pressure of the starting component corresponding to the adapted charge pressure value is decreased by an offset and the resultant change in the torque of the electric machine is ascertained. For the case in which the torque at the electric machine decreases by a defined amount within a defined plausibility-check time period, a plausible adapted charge pressure value is inferred. Otherwise, an implausible adapted charge pressure value is inferred.

Preferably, in order to adapt the charge pressure value of the starting component, the actuating pressure of the starting component is changed starting from the predefined charge pressure value for the starting component to be adapted for as long as it takes until a defined change in the torque is detected at the electric machine due to the change in the actuating pressure within a defined adaptation time period. This adaptation of the charge pressure value, which is carried out prior to the plausibility check, is particularly preferred for adapting the charge pressure value.

Preferably, the method is carried out while the vehicle is stationary and, in fact, with an electric machine running at a constant speed and operated in a speed-controlled manner. In this way, the adaptation and plausibility check of the charge pressure value of the starting component can be carried out in a particularly advantageous manner.

BRIEF DESCRIPTION OF THE DRAWINGS

Exemplary embodiments of the invention are explained in greater detail with reference to the drawings, without being limited thereto, wherein.

DETAILED DESCRIPTION

Figure 1:
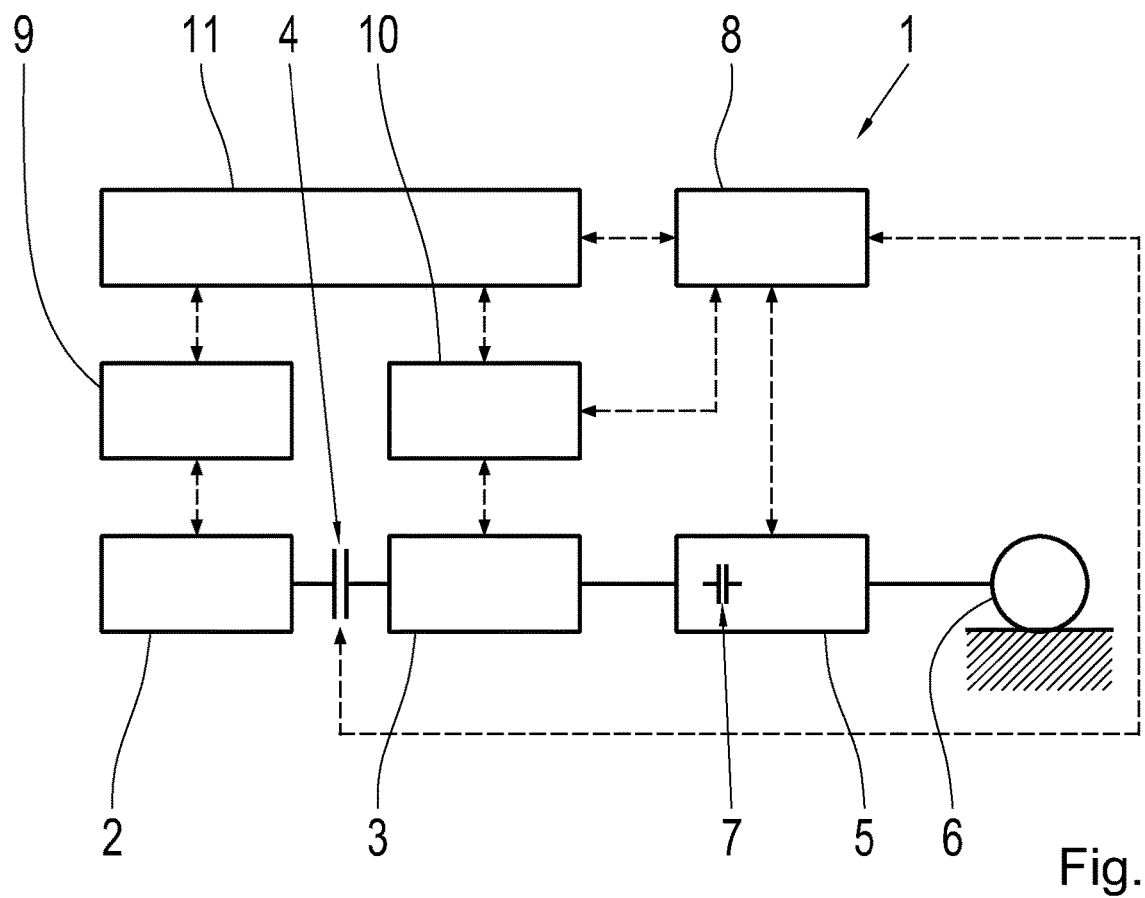
FIG. 1 shows a block diagram of a drive train of a vehicle in the form of a hybrid vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagram of a drive train 1 of a hybrid vehicle. The hybrid vehicle includes a drive unit, which has an electric machine 3 and an internal combustion engine 2. A separating clutch 4 is connected between the electric machine 3 and the internal combustion engine 2. A transmission 5 is connected between the electric machine 3 and a driven end 6 of the hybrid vehicle.

For the case in which the separating clutch 4 is disengaged, the internal combustion engine 2 is decoupled from the electric machine 3, from the transmission 5, and from the driven end 6. In this case, when a force-locking gear is engaged in the transmission 5, drive torque is provided at the driven end 6 exclusively starting from the electric machine 3. When the separating clutch 4 is disengaged, the internal combustion engine 2 can run or be shut off.

For the case in which the drive train 1 from FIG. 1 is operated with the separating clutch 4 disengaged and the internal combustion engine 2 shut off, the condition of a purely electric operation is present.

For the case in which the internal combustion engine 2 runs while the separating clutch 4 is disengaged, for example, in order to drive a generator (not shown) and charge an electric energy store (not shown), a serial driving operation of the drive train 1 is present.

The transmission 5 includes shift elements 7. In FIG. 1, one of the shift elements 7 of the transmission 5 is in the form of a launch clutch. The shift element of the transmission 5 acting as a launch clutch 7 is a friction-locking shift element, such as a clutch or a brake of the transmission 5.

In deviation from FIG. 1, it is also possible that a transmission-external, friction-locking clutch is used as a launch clutch, which is then connected between the electric machine 3 and the transmission 5.

FIG. 1 also shows control-side assemblies of the drive train, such as a transmission control unit 8, which controls the operation of the transmission 5 by way of an open-loop and/or closed-loop system. For this purpose, the transmission control unit 8 exchanges data with the transmission 5 as indicated by the double arrow shown. The separating clutch 4 connected between the internal combustion engine 2 and the electric machine 3 can also be actuated via the transmission control unit 8.

The transmission control unit 8 is also used to actuate the transmission-internal starting component 7 shown in FIG. 1. If a transmission-external starting component is present, the transmission-external starting component can also be actuated starting from the transmission control unit 8.

The operation of the internal combustion engine 2 is controlled by an internal combustion engine control unit 9 by way of an open-loop and/or closed-loop system. The operation of the electric machine 3 is controlled by an electric machine control unit 10 by way of an open-loop and/or closed-loop system. For this purpose, the internal combustion engine control unit 9 exchanges data with the internal combustion engine 2 and the electric machine control unit 10 exchanges data with the electric machine 3, as indicated by the dashed-line arrows in both cases. The internal combustion engine control unit 9 and the electric machine control unit 10 also exchange data with a hybrid control unit 11.

In addition, the hybrid control unit 11 exchanges data with the transmission control unit 8. According to FIG. 1, the transmission control unit 8 can also communicate directly with the electric machine control unit 10. Although not shown in FIG. 1, a direct data exchange can also take place between the internal combustion engine control unit 9 and the electric machine control unit 10.

The hybrid control unit 11 can be an integral part of the internal combustion engine control unit 9 on the hardware side. It is possible, however, that the hybrid control unit 11 is an integral part of the transmission control unit 8 on the hardware side.

The hybrid control unit 11 controls, by way of an open-loop and/or closed-loop system, in particular, a torque output from the internal combustion engine 2 and the electric machine 3. The transmission control unit 8 controls, by way of an open-loop and/or closed-loop system, the operation of the transmission 5 and of the separating clutch 4.

Although this system architecture of the control units 8, 9, 10 and 11 is preferred, another control-side system architecture can also be implemented, of course.

Figure 2:
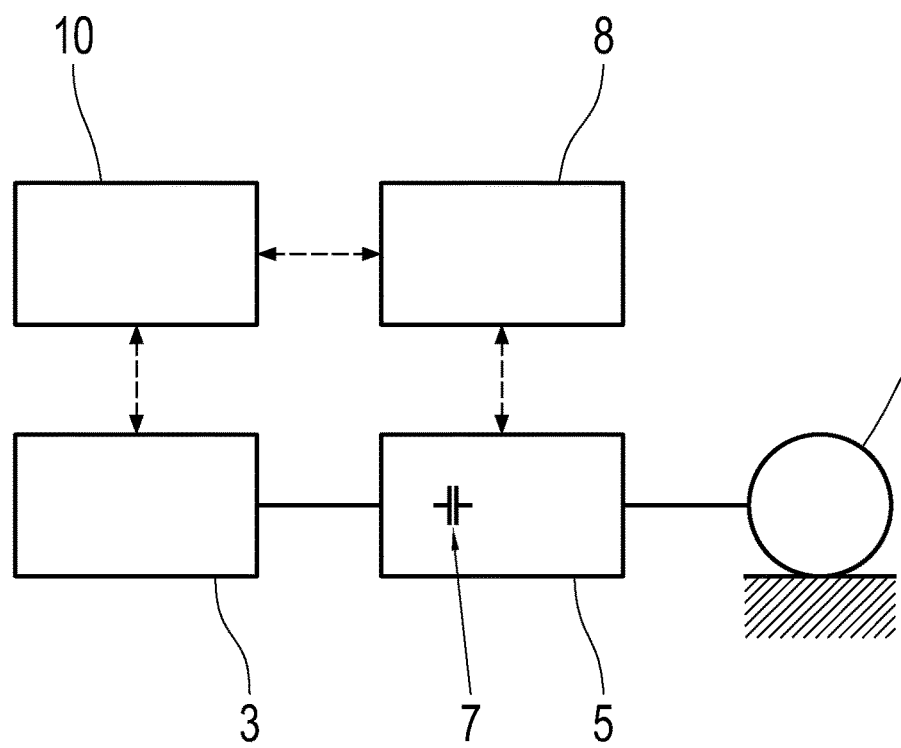
FIG. 2 shows a block diagram of a drive train of a vehicle in the form of a fully electric vehicle.

While FIG. 1 shows a drive train of a vehicle in the form of hybrid vehicle, FIG. 2 shows a drive train configuration of a purely electric vehicle. A purely electric vehicle does not have an internal combustion engine 2. Therefore, the internal combustion engine control unit 9 and the hybrid control unit 11 as well as the separating clutch 4 can also be dispensed with.

With respect to the assemblies 3, 5, 6, 7, 8 and 10, however, the drive train from FIG. 2 matches the drive train from FIG. 1, and so identical reference signs are used for identical assemblies in order to avoid unnecessary repetitions.

The starting component 7 of the vehicle is used for the open-loop or closed-loop control of a starting process of the vehicle. As mentioned above, the starting component 7 is a friction-locking shift element or a friction-locking, transmission-external clutch.

For the case in which a starting component 7 of this type is engaged up to the touch point, the starting component 7 begins to transmit torque. The starting component 7 is actuated via pressure actuation. If the starting component 7 is actuated with a charge pressure value, the starting component 7 is to be in the touch point.

For a starting component 7, the charge pressure value is predefined on the control side. In order to adapt the control-side-predefined charge pressure value for the starting component 7 depending on component tolerances and depending on wear and aging, the control-side-predefined charge pressure value for the starting component 7 can be adapted in order to determine an adapted charge pressure value. The adaptation can be carried out in a known manner.

Preferably, the charge pressure value of the starting component 7 is adapted such that the actuating pressure of the starting component 7 is changed, in particular increased, starting from the predefined charge pressure value for the starting component 7 to be adapted for as long as it takes until a defined change in the torque is detected at the electric machine 3 of the drive train 1 due to the change in the actuating pressure within a defined adaptation time period. This actuating pressure, at which it is detected that the defined change in the torque is present at the electric machine 3, is preferably decreased by a defined amount in order to thus ascertain the adapted charge pressure value.

According to example aspects of the invention, the plausibility of the adapted charge pressure value is checked. In order to check the plausibility of the adapted charge pressure value, the actuating pressure of the starting component 7 corresponding to the adapted charge pressure value is changed by an offset. The resultant change in the torque at the electric machine 3 is ascertained.

For the case in which the change in the torque of the electric machine 3 and the offset of the actuating pressure correspond to each other within defined limits, i.e., when an actual change in the torque corresponds within defined limits to a target change in the torque of the electric machine 3 that is expected due to the offset of the actuating pressure, a plausible adapted charge pressure value is inferred. However, for the case in which the change in the torque of the electric machine and the offset of the actuating pressure do not correspond to each other within the defined limits, i.e., when the actual change in the torque at the electric machine 3 does not correspond to the target change in the torque of the electric machine 3 that is expected due to the offset, an implausible adapted charge pressure value is inferred.

For the case in which a plausible adapted charge pressure value is inferred, the adapted charge pressure value is actually used to adapt the predefined charge pressure value to be adapted. However, when an implausible adapted charge pressure value is inferred, the adapted charge pressure value is not used to adapt the predefined charge pressure value to be adapted.

The method according to example aspects of the invention is preferably carried out when the vehicle is stationary. The vehicle can be either a hybrid vehicle 1 or a fully electric vehicle (see FIG. 2). In order to carry out the method according to example aspects of the invention, the electric machine 3 is operated at a constant speed in a speed-controlled manner.

Figure 3:
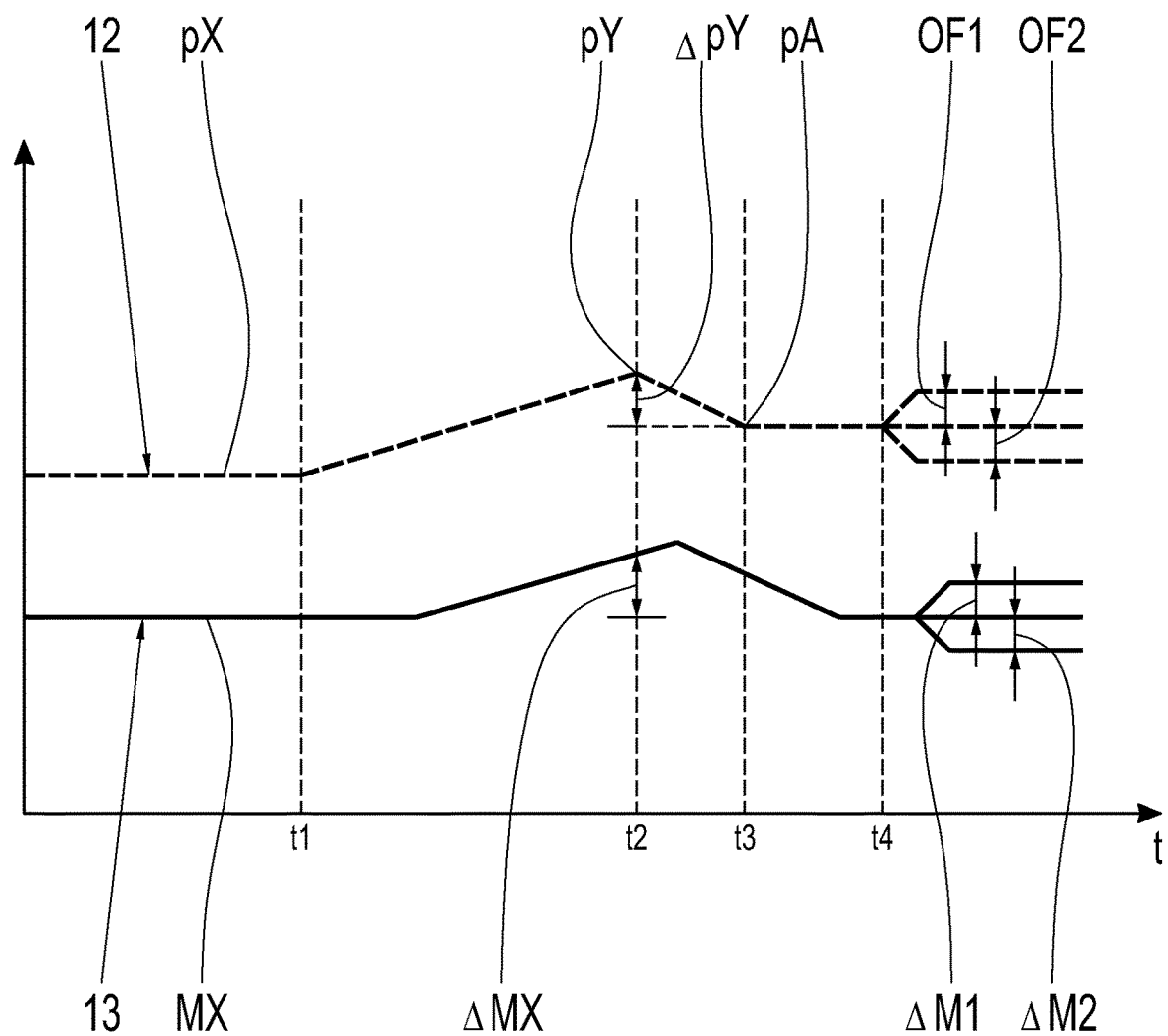
FIG. 3 shows a time-dependency diagram for illustrating the method according to example aspects of the invention.

Further details are described in the following with reference to FIG. 3. FIG. 3 shows a time curve of an actuating pressure 12 for the starting component 7 and a time curve of a torque 13 at the electric machine 3 over time t.

Prior to the point in time t1, the actuating pressure 12 for the starting component 7 corresponds to a control-side-predefined charge pressure value pX to be adapted. The electric machine 3 is operated at a constant speed in a speed-controlled manner. The torque MX builds up at the electric machine 3 according to the curve profile 13.

At the point in time t1, the adaptation of the charge pressure value pX to be adapted begins. In FIG. 3, in order to adapt the charge pressure value of the starting component 7, the charge pressure value pX to be adapted is adapted by changing, namely linearly increasing along a ramp, the actuating pressure of the starting component 7 starting from the predefined charge pressure value pX for the starting component 7 to be adapted for as long as it takes until a defined change in the torque ΔMX forms at the electric machine 3 due to the change in the actuating pressure within a defined adaptation time period. This is the case at the point in time t2 in FIG. 3.

The actuating pressure pY at the point in time t2 is then decreased by a control-side-predefined value ΔpY. The actuating pressure pY that has been reduced by the predefined value ΔpY corresponds to the adapted actuating pressure pA. At the point in time t3, the actuating pressure 12 corresponds to the actuating pressure pA, which has been adapted by way of the adaptation.

The adaptation of the actuating pressure pX to be adapted in order to ascertain the adapted actuating pressure pA is therefore carried out between the points in time t1 and t3.

Thereafter, the starting component 7 is actuated with the adapted actuating pressure pA at the point in time t3 in FIG. 3. The plausibility check of the adapted charge pressure value begins at the point in time t4 in FIG. 3. According to FIG. 3, starting at the point in time t4, the actuating pressure for the starting component 7, which corresponds to the adapted charge pressure value pA, is changed. The torque 13 changes at the electric machine 3 with a certain time delay according to the curve profile 13. Therefore, in order to check the plausibility of the adapted charge pressure value, the actuating pressure 12 of the starting component corresponding to the adapted charge pressure value is increased by an offset OF1 and the resultant change in the torque ΔM1 of the electric machine 3 is ascertained. For the case in which the torque at the electric machine 3 increases by a defined amount within a defined plausibility-check time period, a plausible adapted charge pressure value is inferred. Otherwise, an implausible adapted charge pressure value is inferred. Similarly, in order to check the plausibility of the adapted charge pressure value pA, the actuating pressure 12 of the starting component 7 corresponding to the adapted charge pressure value is decreased by an offset OF2. The resultant change in the torque ΔM2 at the electric machine is ascertained. For the case in which the torque at the electric machine 3 decreases by a defined amount within a defined plausibility-check time period, a plausible adapted charge pressure value is inferred. Otherwise, an implausible adapted charge pressure value is inferred.

The charge pressure value is used for the adaptation, or not, depending on whether an implausible or plausible charge pressure value pA is inferred.

Example aspects of the invention further relate to a control unit for carrying out the method according to example aspects of the invention. The control unit is designed to automatically carry out the above-described method.

The control unit according to example aspects of the invention is preferably the transmission control unit 8. The transmission control unit 8 is an electrical or electronic control unit, which includes hardware and software for carrying out the method according to example aspects of the invention. The hardware includes data interfaces for exchanging data with the assemblies contributing to the carrying-out of the method according to example aspects of the invention, such as, for example, with the starting component 7 and the electric machine control unit 10. The hardware further includes a processor for data processing and a memory for data storage. The software includes program modules, which are implemented in the control unit to carry out the method according to example aspects of the invention.

The control unit is designed to check the plausibility of an adapted charge pressure value by changing an actuating pressure of the starting component 7, which corresponds to the adapted charge pressure value, by an offset and ascertaining a resultant change in the torque at the electric machine 3. For the case in which the change in the torque at the electric machine 3 and the offset of the actuating pressure correspond to each other within defined limits, the control unit infers a plausible adapted charge pressure value. However, for the case in which the change in the torque at the electric machine 3 and the offset of the actuating pressure do not correspond to each other within the defined limits, the control unit infers an implausible adapted charge pressure value.

In order to check the plausibility of the adapted charge pressure value, a correlation is established between the change in the actuating pressure corresponding to the adapted charge pressure value and the change in the torque at the electric machine 3.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 drive train
2 internal combustion engine
3 electric machine
4 separating clutch
5 transmission
6 driven end
7 shift element/starting component
8 transmission control unit
9 internal combustion engine control unit
10 electric machine
11 hybrid control unit
12 actuating pressure of starting component
13 torque of electric machine

The invention claimed is:

1. A method for operating a drive train (1) of a vehicle that includes an electric machine (3), a transmission (5), a starting component (7), and a driven end (6), the transmission (5) connected between the electric machine (3) and the driven end (6), the starting component (7) comprising a friction-locking shift element of the transmission (5) or a transmission-external, friction-locking clutch, the method comprising:

adapting a predefined charge pressure value for the starting component (7) to be adapted in order to determine an adapted charge pressure value for the starting component (7);

in order to check a plausibility of the adapted charge pressure value, changing an actuating pressure of the starting component (7) corresponding to the adapted charge pressure value by an offset and ascertaining a change in a torque of the electric machine (3); and when the change in the torque of the electric machine (3) and the offset of the actuating pressure correspond within defined limits, inferring a plausible adapted charge pressure value, or, when the change in the torque of the electric machine (3) and the offset of the actuating pressure do not correspond within the defined limits, inferring an implausible adapted charge pressure value.

2. The method of claim 1, wherein, when the plausible adapted charge pressure value is inferred, the adapted charge pressure value is used to adapt the predefined charge pressure value.

3. The method of claim 1, wherein, when the plausible adapted charge pressure value is not inferred, the adapted charge pressure value is not used to adapt the predefined charge pressure value.

4. The method of claim 1, wherein:

changing the actuating pressure of the starting component (7) comprises increasing the actuating pressure of the starting component (7) corresponding to the adapted charge pressure value by the offset; and inferring the plausible adapted charge pressure value comprises inferring the plausible adapted charge pressure value when the torque of the electric machine (3) increases by a defined amount within a defined plausibility-check time period or otherwise inferring the implausible adapted charge pressure value.

5. The method of claim 1, wherein:

changing the actuating pressure of the starting component (7) comprises decreasing the actuating pressure of the starting component (7) corresponding to the adapted charge pressure value by the offset; and inferring the plausible adapted charge pressure value comprises inferring the plausible adapted charge pressure value when the torque of the electric machine (3) decreases by a defined amount within a defined plausibility-check time period or otherwise inferring the implausible adapted charge pressure value.

6. The method of claim 1, wherein the vehicle is a fully electric vehicle without an internal combustion engine.

7. The method of claim 1, wherein the vehicle is a hybrid vehicle with an internal combustion engine (2), the electric machine (3) is connected between the internal combustion engine (2) and the transmission (5), and the internal combustion engine (2) is decouplable via a separating clutch (4) connected between the electric machine (3) and the internal combustion engine (2).

8. The method of claim 1, wherein the method is carried out when the vehicle is stationary.

9. The method of claim 1, further comprising, in order to adapt the predefined charge pressure value of the starting component (7), changing the actuating pressure of the starting component (7) starting from the predefined charge pressure value for the starting component (7) to be adapted until a defined change in the torque is detected at the electric machine (3) due to the change in the actuating pressure within a defined adaptation time period.

10. A control unit configured for automatically implementing the method of claim 1.

11. A control unit (8) of a vehicle, configured for checking a plausibility of an adapted charge pressure value by:
- changing an actuating pressure of a starting component (7) corresponding to the adapted charge pressure value by an offset;
- ascertaining a resultant change in a torque of an electric machine (3); and
- when the change in the torque of the electric machine (3) and the offset of the actuating pressure correspond within defined limits, inferring a plausible adapted charge pressure value, or, when the change in the torque of the electric machine (3) and the offset of the actuating pressure do not correspond within the defined limits, inferring an implausible adapted charge pressure value.

* * * * *